United States Patent [19]

Miyahara

[11] Patent Number: 5,279,213
[45] Date of Patent: Jan. 18, 1994

[54] APPARATUS FOR PRODUCING PREPARED FOODS BY ELECTRICAL CONDUCTION

[75] Inventor: Kingo Miyahara, Tokyo, Japan

[73] Assignee: Dowa Co., Ltd., Tokyo, Japan

[21] Appl. No.: 747,866

[22] Filed: Aug. 20, 1991

[51] Int. Cl.$^5$ .................................. H05B 1/00
[52] U.S. Cl. .............................. 99/358; 99/331; 392/311
[58] Field of Search ............... 99/358, 331, 337, 403, 99/483; 392/34, 312, 313, 322

[56] References Cited

U.S. PATENT DOCUMENTS

| | | | |
|---|---|---|---|
| 1,919,050 | 7/1933 | Warner | 99/358 |
| 2,075,474 | 3/1937 | Scutt | 99/358 |
| 2,924,167 | 2/1960 | Rhodes . | |
| 3,257,934 | 6/1966 | Korr | 99/358 |
| 3,330,203 | 7/1967 | Korr | 99/358 |
| 3,543,673 | 12/1970 | McDevitt | 99/358 |
| 3,771,433 | 11/1973 | King | 99/331 |
| 3,842,724 | 10/1974 | Korr et al. | 99/358 |
| 3,863,048 | 1/1975 | Buckley | 99/358 |
| 4,048,473 | 9/1977 | Burkhart | 99/331 |
| 4,484,064 | 11/1984 | Murray | 99/474 |
| 4,522,834 | 6/1985 | Miyahara | 99/358 |
| 4,971,819 | 11/1990 | Miyahara | 99/358 |
| 4,982,654 | 1/1991 | Bourgeois | 99/331 |
| 4,982,655 | 1/1991 | Wen-Der et al. | 99/337 |
| 5,048,400 | 9/1991 | Veda et al. | 99/331 |
| 5,058,192 | 10/1991 | Miyahara | 99/358 |

FOREIGN PATENT DOCUMENTS

| | | | |
|---|---|---|---|
| 40578/85 | 10/1985 | Australia . | |
| 57431/86 | 11/1986 | Australia . | |
| 47856/90 | 7/1990 | Australia . | |
| 0379283 | 7/1990 | European Pat. Off. . | |
| 1248186 | 8/1967 | Fed. Rep. of Germany | 392/311 |
| 1276250 | 8/1968 | Fed. Rep. of Germany | 392/311 |
| 1565520 | 5/1969 | France . | |
| 0151873 | 8/1984 | Japan | 99/358 |
| 0323306 | 9/1957 | Switzerland | 392/311 |
| 1228914 | 4/1971 | United Kingdom . | |

*Primary Examiner*—Philip R. Coe
*Assistant Examiner*—Tony G. Soohoo
*Attorney, Agent, or Firm*—Pollock, Vande Sande & Priddy

[57] ABSTRACT

An apparatus for producing prepared food by electrical conduction comprising: a processing container for electrical conduction having an opened top, a pair of electrodes mounted on both inner sides of the processing container, one ends of said electrodes extending to the outside so that a contact part is formed; a base to which said processing container may be detachably disposed; a control box for electrical conduction, mounted on one side of said base, provided with a transmission part adapted to be in contact with said contact part of the processing container so that electricity transmits to said electrodes; an operating arm vertically pivoted to the top of said control box; a lid disposed on the end of said operating arm and covering the open top of said processing container; and a temperature sensor fitted up with the tip of said operating arm and sensing a temperature of said processing container.

12 Claims, 6 Drawing Sheets

APPARATUS FOR PRODUCING PREPARED FOODS BY ELECTRICAL CONDUCTION

BACKGROUND OF THE INVENTION

The present invention relates to an apparatus for producing prepared food by electrical conduction. It contains a lid which covers an upper opening of the apparatus and a processing container which has a pair of electrodes disposed on two sides of the inner wall of the container. Foodstuffs can be safely and accurately warmed to an appropriate temperature in a very short time by electrical conduction employing the electrodes of the processing container. Such foods include Chinese, Japanese and other kinds of noodles, cooked rice, beans and various kinds of soup including miso soup, etc.

It is well known that instant foods such as Chinese (ramen) and Japanese (udon) noodles and miso soup can be prepared simply by pouring boiling water on the instant food within a disposable container. These foods are prepared by pre-dehydrated processing and designed so that they can be reconstituted and eaten immediately after boiling water is poured on them. Such a process is shown for example in Japanese Utility Model Publication No. 56-23253 prior to the present invention.

However, with conventional instant foods, if the water poured into a container is not hot enough, sometimes the instant foods cannot be sufficiently heated, and they cannot be eaten even if they are preprocessed. They may need to be reheated in pots and pans or have fresh boiling water poured on them, and so forth. Dietary standards have improved in recent years and there is a trend towards natural foods. Since tastes and textures of preprocessed instant foods are inferior to natural and non-instant foods, consumers tend to shy away from them. Since foods such as Chinese noodles or processed rice are dried after they have expanded, they are not suited for consumer's tastes. This is one of various problems that has come up.

SUMMARY OF THE INVENTION

The present invention allowed to solve such problems of the prior art. An object of the present invention is to provide an apparatus for producing prepared food by electrical conduction in such a manner that foodstuffs can be safely warmed and cooked without using boiling water and an electronic oven and so forth. Another object of the present invention is to provide a processing container for conduction to accommodate processed foodstuffs for use as instant foods and preprocessed foodstuffs with appropriate water or moisture; the foodstuffs can be safely warmed and cooked at an accurate temperature by electrical conduction; the action is provided between a pair of electrodes opposed to each other in the processing container by electrical conduction; the foodstuffs accommodated in the processing container for electrical conduction can be heated sufficiently until the materials boil in a very short time; noodles such as unprocessed Chinese noodles and unprocessed rice can be cooked normally; other common uncooked or cooked foods can be warmed or cooked. Another object of the present invention is to provide an apparatus to warm and cook foodstuffs safely even if the processing container for electrical conduction is made of inexpensively disposable materials.

To achieve the above-described objects, an apparatus for producing prepared food by electrical conduction in accordance with the present invention comprises a processing container for electrical conduction having an open surface and a pair of electrodes being disposed on both sides of the inner processing container, in such a manner that each end of the electrodes is extended to the outside of the processing container so that a contact part is formed; a base being detachably mounted with the processing container for conduction; a control box for conduction being mounted on one side of the base plate, in such a manner that the box has a transmission part which is in contact with the contact part of the container and transmits electricity between a pair of electrodes; an operating arm being vertically pivoted to the top of the control box; a lid being disposed on the end of the operating arm and covering the open surface; and a temperature sensor being fitted up with the end of the operating arm and sensing a temperature of the processing container for conduction.

BRIEF DESCRIPTION OF THE DRAWINGS

The manner in which the foregoing and other objects of this invention are accomplished will become apparent from the accompanying specification and claims considered together with the drawings, wherein:

DESCRIPTION OF THE PREFERRED EMBODIMENTS

Referring now to the accompanying drawings, the preferred embodiment of the present invention is described.

Figure 1:
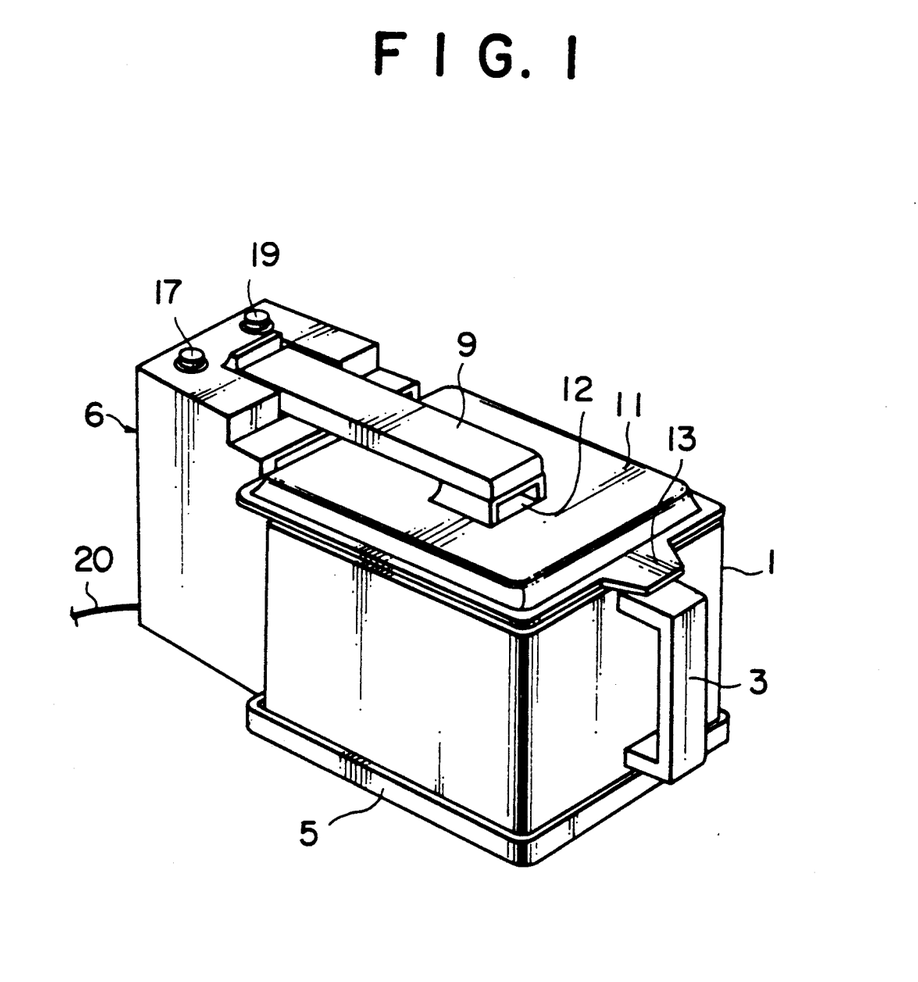
FIG. 1 is a perspective view of an apparatus for producing prepared foods by electrical conduction employing the present invention.
Figure 3:
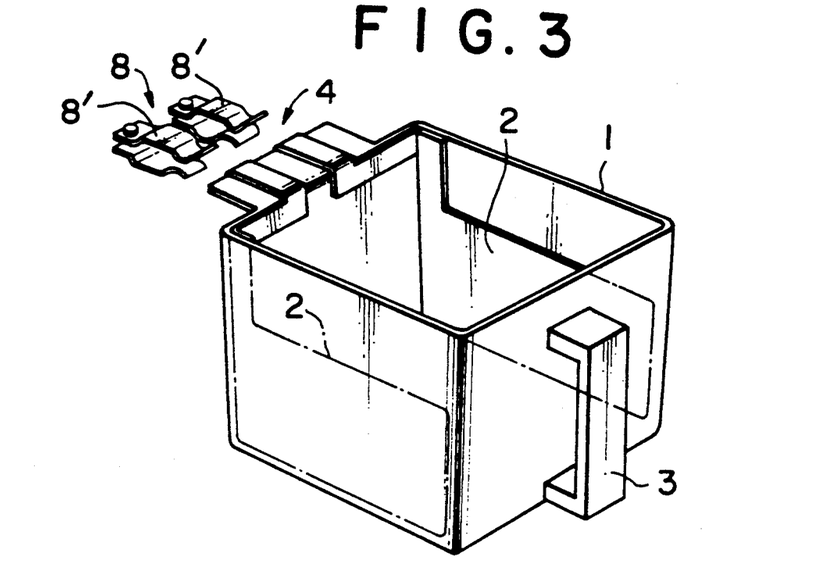
FIG. 3 is an exploded and perspective view of the main part of the apparatus for producing prepared foods by electrical conduction shown in FIG. 1.

In FIG. 1 and FIG. 3, a processing container for electrical conduction 1 may be any box-shaped container having a bottom, an open top and a pair of opposed electrodes 2 and 2 which are located on two sides of the inner wall of the container. The whole body of the processing container 1 is plasticized with insulating materials such as synthetic resin or glass and a handle 3 is fixed on one side of the container 1. The inside of the processing container 1 accommodates foodstuffs which contains a suitable amount of electrolyte (e.g. salt), for example, noodles such as Chinese noodles, Japanese noodles, buckwheat noodles (soba), spaghetti, rice, beans, and various kinds of soup including miso with a suitable amount of water and moisture.

A pair of opposed electrodes 2 and 2 are disposed on two side walls inside the processing container 1. One end of the electrodes 2 and 2 forms a contact part 4 in such a manner that one end of the electrodes is projected to the outside through the upper edge of the processing container 1. It is preferable that the electrodes are made of electrically conductive materials. Metal can be also used for the electrodes. For example, thin plate and wire rod made of titanium and aluminum, foil, foil whose surface is laminated with synthetic resin film, carbon, and synthetic resin mixed in carbon. The essential thing is that materials and shapes can be selected optionally.

A base 5 is molded with insulating materials and a processing container for electrical conduction 1 is detachably placed on the base 5. A control box 6 for electrical conduction is mounted on one side of the base 5. The inside of the box 6 accommodates various kinds of electrical equipments. An opening 7 is formed on one side of the box 6 and the contact part 4 of the electrodes 2 and 2 may be inserted in the opening 7. A transmission part 8 consisting of two upper and lower contact pieces 8', 8' is provided in the control box 6 close to the opening 7. By fitting the contact part 4 into the transmission part 8, the electricity can be transmitted to the contact part 4.

The base side of a lever-shaped operating arm 9 is pivoted to a pivot 10 near the top of the control box 6. The operating arm 9 can be pivotally raised and laid freely on the pivot 10.

A transparent or opacity lid 11 made of insulating materials is molded into an approximately similar shape to the processing container 1 and detachably fitted into the end of the operating arm 9. When the operating arm 9 is down, the lid 11 covers the upper opening of the processing container 1. A steam discharging port 12 opens in the lid 11 at a portion in which the arm 9 is connected. It is a matter of course that the steam discharging port 12 may open in any place of the lid 11. A pull tab 13 is attached to one side of the lid 11.

A temperature sensor 14 is detachably fitted to the operating arm 9 and the lid 11 so that the tip of the sensor faces to the steam discharging port 12. A temperature sensor 14 is formed in such a manner that a temperature sensor senses a temperature of steam passing through the steam discharging port 12, when the sensor senses a predetermined temperature, a power supply current supplied to a pair of electrodes 2, 2 is cut off.

Figure 8:
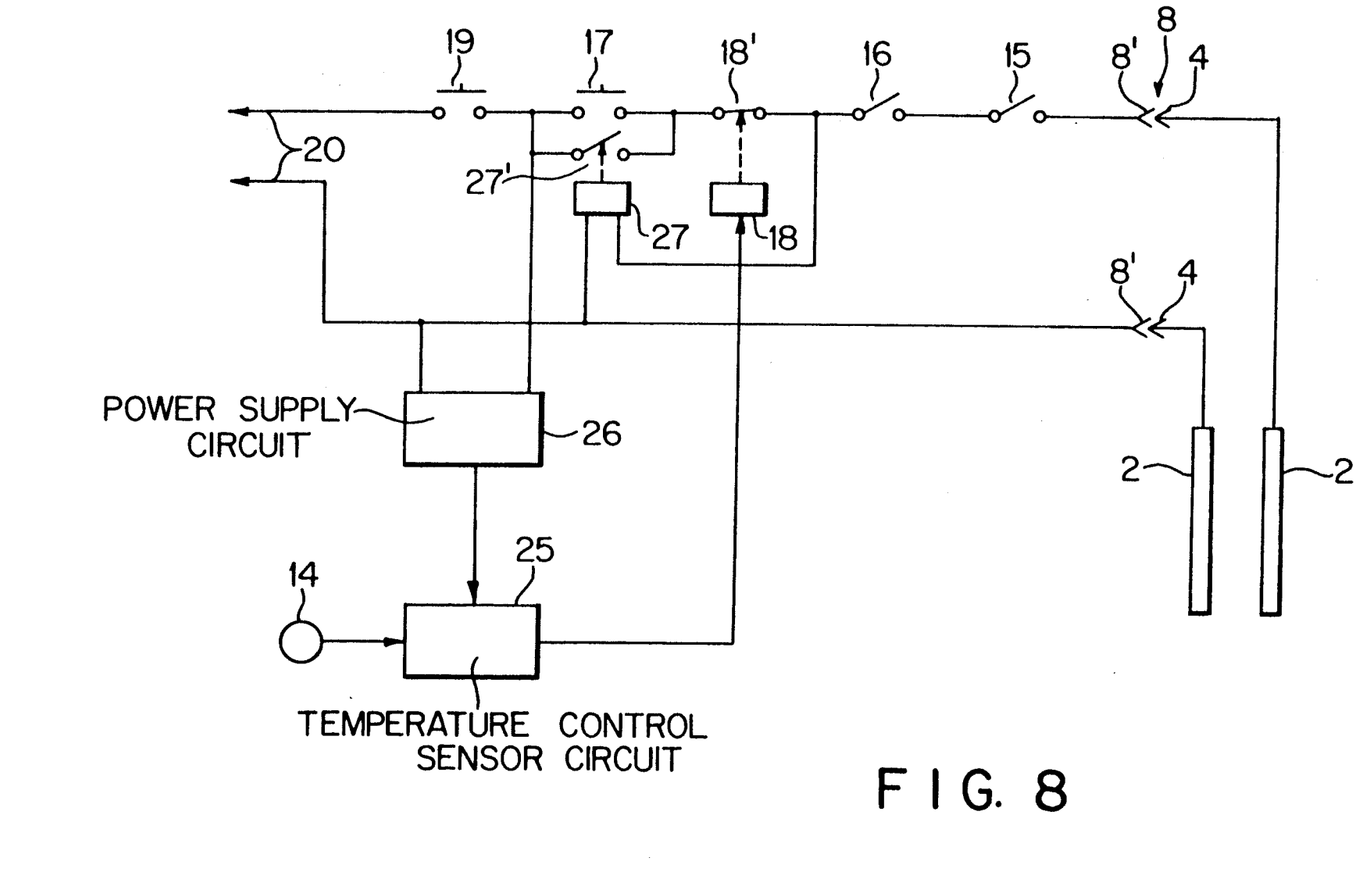
FIG. 8 illustrates an electrical circuit for the processing apparatus of the preferred embodiment.

A first switch 15 is disposed near the transmission part 8 mounted in the control box 6 so that the switch 15 will be closed when it senses the contact part 4 of a pair of electrodes 2, 2 appropriately is in contact with the transmission part 8. A second switch 16 is disposed in the control box 6 near the pivot 10 in such a manner that the second switch 16 will be closed when it senses that the lid 11 covers correctly the upper opening of the processing container 1 appropriately when the opening arm 9 is laid on the pivot 10. A start switch 17 is disposed on the top of the control box 6. As shown in FIG. 8, a contact 18' of a temperature control relay 18 is disposed between the second switch 16 and the start switch 17, and a power supply switch 19 provided on the top of the control box 6 is disposed at the power supply side of the start switch 17 so that these switch 16, contact 18', switches 17 and 19 and a pair of electrodes 2, 2 are arranged in series. A contact 27' of a switch holding relay 27 is arranged parallel to the start switch 17, and this switch holding relay 27 is connected to the power supply between the second switch 16 and the contact 18'. The start switch 17 is a push-button type switch having no switch holding function while the power supply switch is a push-button type switch having a switch holding function. The start switch 17 may be advantageously made by lighting-type push-button which is lighted while the electrodes 1, 2 are conducted. The temperature control relay 18 is disposed in the control box 6 and provided with the contact 18' and receives a signal from the temperature sensor control circuit 25, whereby the contact 18' opens when the temperature sensor 14 senses a predetermined temperature and closes when the sensor senses a temperature below this predetermined temperature. However, once the contact 18' opens, the switch holding relay 27 is reset and the switch holding function of the start switch 17 made by the contact 27' of the switch holding relay 27 is released, even if the temperature sensed by the temperature sensor 14 becomes low and the contact 18' of the temperature control switch 18 is closed after the electrical conduction is completed, this switch holding relay 27 prevents when a temperature of the sensor 14 falls, automatic starting of passing electricity to the electrodes 2,2. Reference numeral 26 denotes a power supply circuit for temperature sensor control circuit 25.

Reference numeral 20 denotes lead lines of AC power supply, such as, for example, 100 volts.

Figure 2:
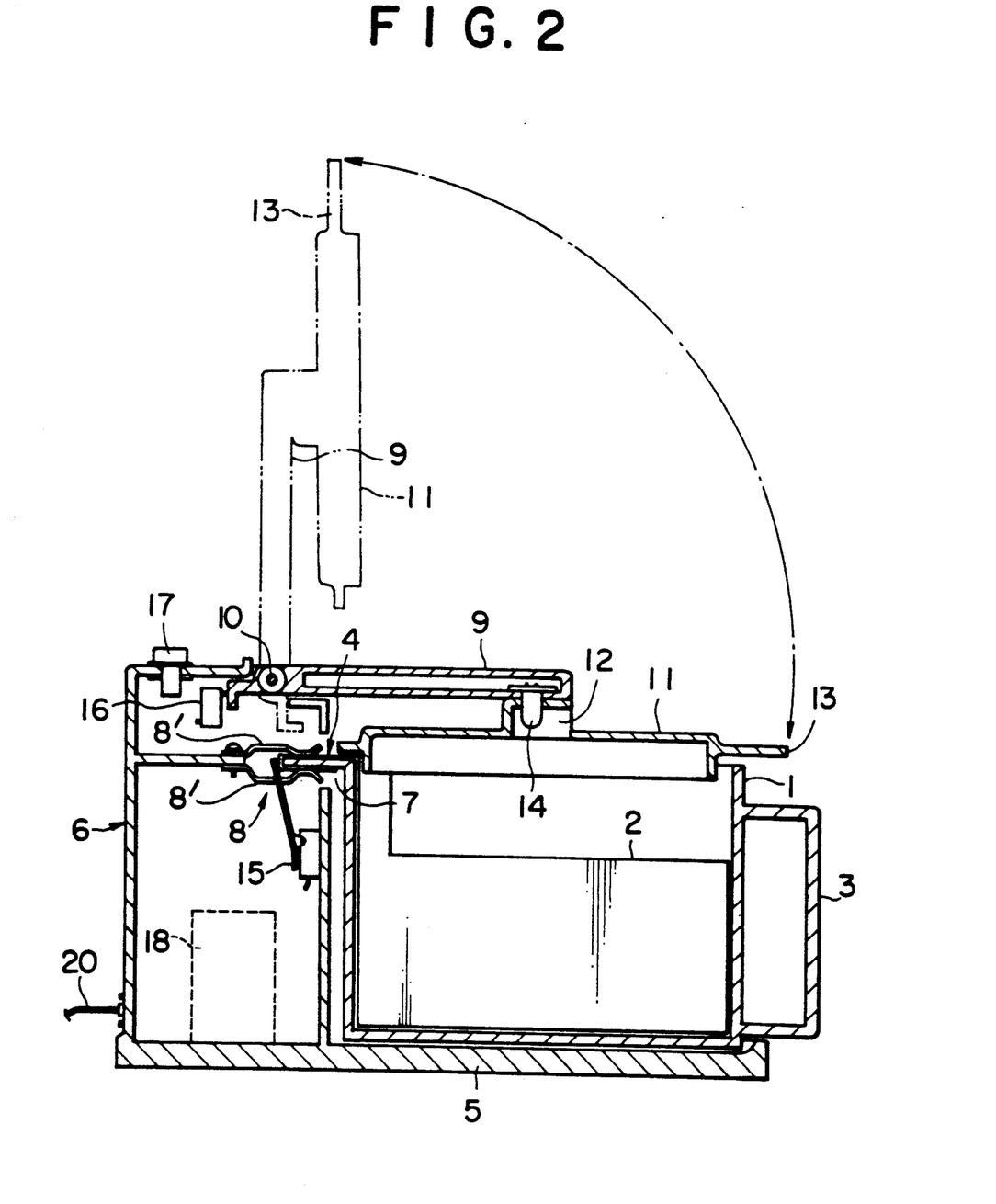
FIG. 2 is a vertical section view of the apparatus for producing prepared foods by electrical conduction shown in FIG. 1.

Next, operation of the embodiment shown in FIG. 1, FIG. 2, and FIG. 3 will be described. Firstly, if operators want to safely and accurately warm and cook foodstuffs of appropriate materials to an appropriate temperature in the processing container by electrical conduction in a very short time, they should put foodstuffs containing a suitable amount of electrolyte (e.g. salt), such as Chinese noodles, Japanese noodles, buckwheat noodles, spaghetti, curry sauce, soup, and rice into the processing container. In a preferable example, 80 g of dehydrated Chinese noodles with approximately 400 cc of water are accommodated in the processing container, dehydrated powder soup is added to water, and the container is placed on the base.

Secondly, the contact part of the processing container is pushed into the transmission part provided on one side of the control box and connected to a AC 100 V power supply.

When the above operations are completed, the operating arm carrying a lid is pivoted to its downward position so that the upper opening of the container is covered with the lid and the power supply switch is turned on.

However, in this condition, since the processing container which accommodates the foodstuffs is accurately placed in the predetermined position and the first and second switches respectively show a closed condition, when a processing operation for electrical conduction is started by switching the start switch, electrical voltage of 100 volts is applied to a pair of electrodes opposed to each other through the contact part of the processing container from the transmission part. Then, an electric current flows through Chinese noodles and water between the electrodes, the water in the processing container is in a boiling condition by generated Joule heat in five to six minutes after from the beginning of the conduction, and the generated steam is discharged to the outside of the container through the steam discharging port and simultaneously the steam temperature is sensed by the temperature sensor.

Therefore, when the temperature sensor senses that the steam temperature reaches 98° C. to 100° C., the power supply switch is shut off by the switch retaining relay and the processing operation for electrical conduction is stopped automatically.

At this time, since the insides of Chinese noodles are heated intensely and the insides of them are heated more sufficiently than the outside of them by preheating of the boiled water, they can be immediately served on the table.

When the operating arm is raised to its upward position, the second switch is "opened" in a non-sensing condition. If the processing container is taken out of the base, the first switch is "opened" in a non-sensing condition. If an operation procedure is mistaken, the safety is maintained securely.

Operators can transfer the cooked Chinese noodles from the processing container to another container to be served. Another quantity of Chinese noodles can be cooked in succession after going through the same procedure.

Therefore, compared with a conventional case in which Chinese noodles are boiled in pots or pans, since electricity directly passes through the insides of Chinese noodles and the noodles are heated with the Joule heat, Chinese noodles, which are heated and cooked sufficiently in a very short time, can be obtained.

The embodiment showing FIGS. 4 to 7 is an apparatus for producing prepared food by electrical conduction in which the processing container 1A for electrical conduction is disposable and the foodstuffs can be warmed and cooked by electrical conduction in a very short time. The processing container 1A is made of insulating materials such as styrofoam synthetic resin and paper vessel etc. and the materials are very inexpensive and fit to be disposable. Even if the processing container 1A is in any shape such as a square, a rectangle, and a circle, it is formed in such a manner that the processing operation by conduction can be done. A pair of opposed electrodes 2A and 2A, similar to the first invention, are disposed on opposite sides of the inner wall of the inner container. The disposable processing container 1A is accommodated within an insulating container holder 21 detachably disposed on the base 5 so that the container 1A is freely placed in and removed from the holder 21.

Figure 4:
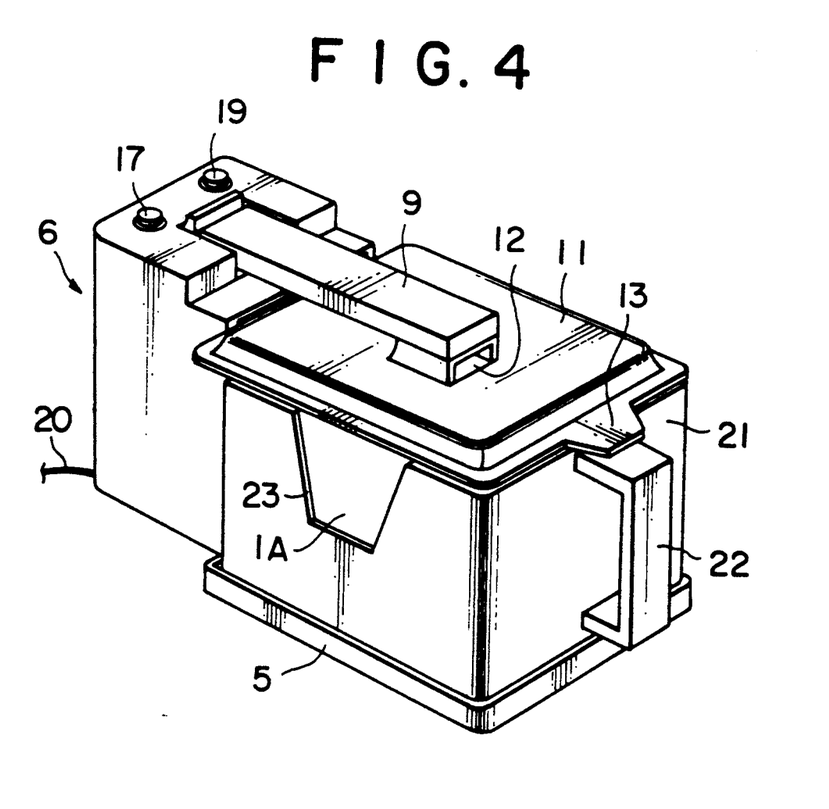
FIG. 4 is a perspective view of the apparatus for producing prepared foods by electrical conduction according to another embodiment of the present invention.
Figure 5:
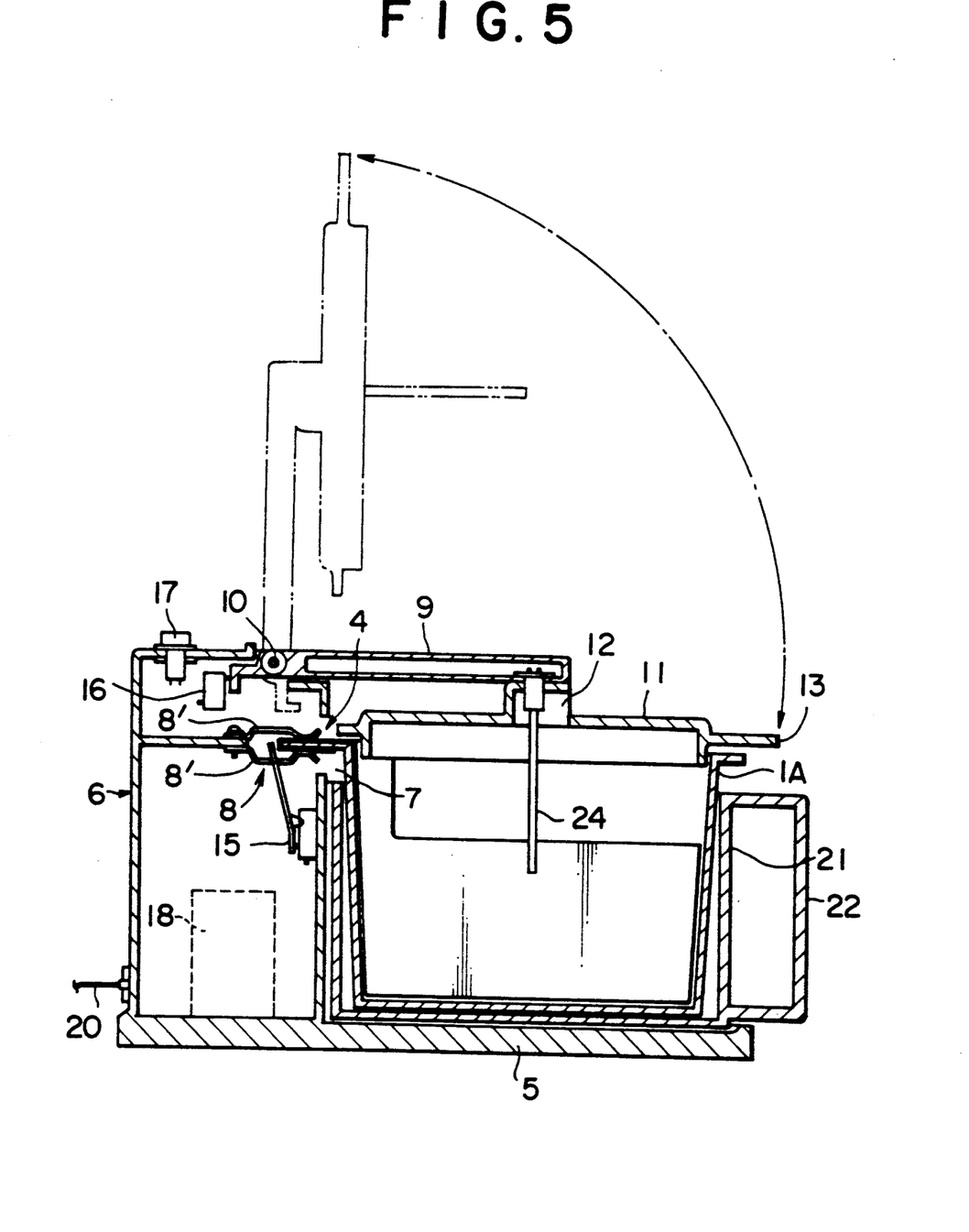
FIG. 5 is a vertical section view of the apparatus for producing prepared foods by electrical conduction shown in FIG. 4.
Figure 6:
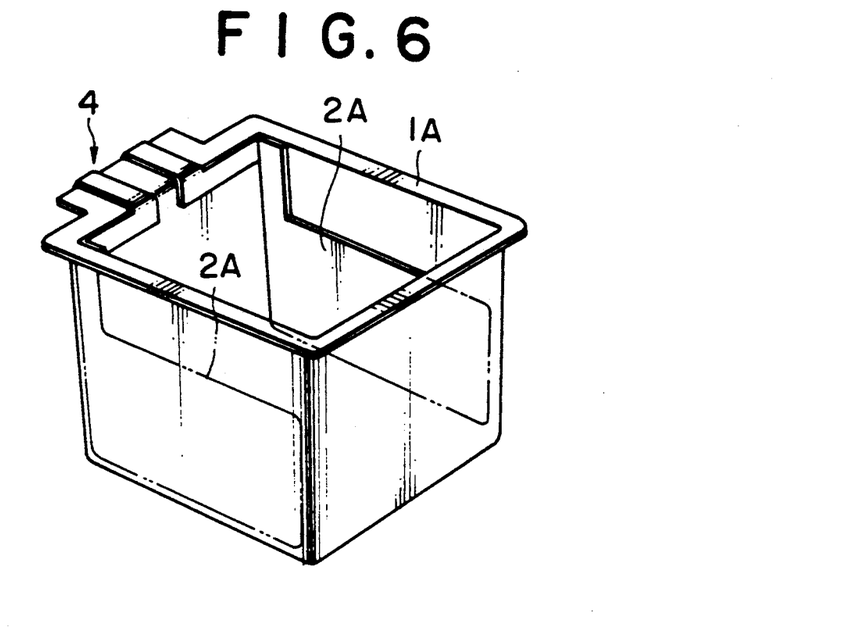
FIG. 6 is a perspective view of a processing container for electrical conduction shown in FIG. 4.
Figure 7:
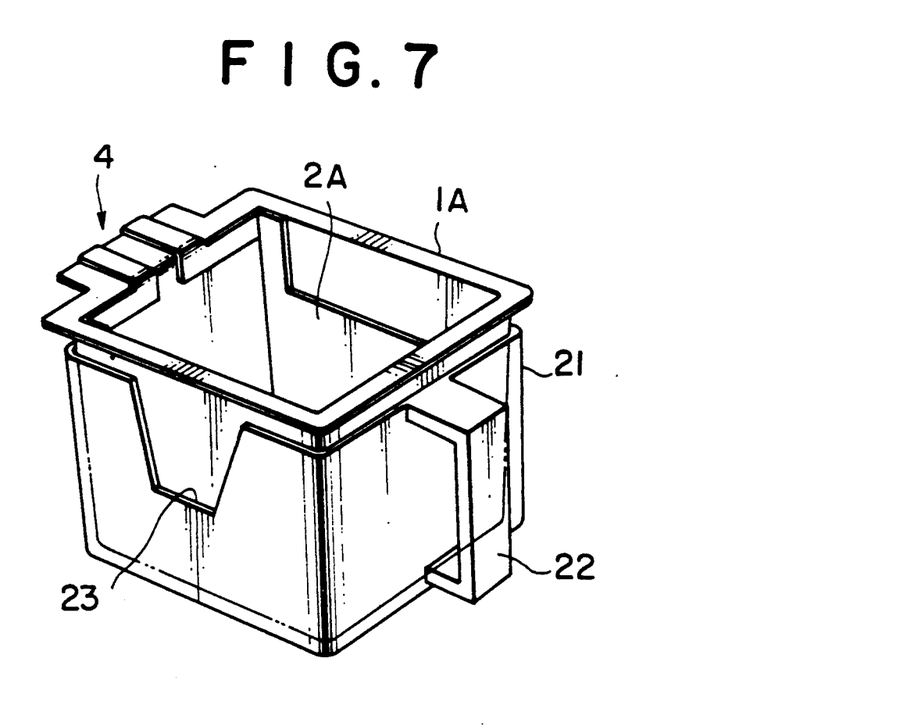
FIG. 7 is a perspective view showing the condition in which the processing container for electrical conduction shown in FIG. 6 is accommodated within a container holder.

In this embodiment, even if the processing container 1A is molded with a material having less heat resistance characteristic or less strength to keep its shape, it may be installed on and removed from the base 5, operators can hold the handle 22 of the container holder 21 and safely and securely take out the processing container 1A together with the container holder 21 from the base 5; if the water is hissing hot and soup overflows the processing container 1A, the soup can be caught in the container holder 21; notches 23 and 23 are made on both sides of the container holder 21 as shown in FIG. 4 and FIG. 7 so that operators can easily and securely fit into and pull the processing container 1A out of the container holder 21 with both hands; and the tip of the temperature sensor 24, hung through the steam discharging port 12, is made to face to the inside of the processing container 1A so that foodstuffs or liquid temperature in the container 1A can be sensed.

In the apparatus for producing prepared foods by electrical conduction shown in FIGS. 4 to 7, foodstuffs such as dehydrated Chinese noodles are placed in advance into the disposable container having a pair of electrodes disposed on two opposite sides, similar to the apparatus of the first embodiment of the present invention, and water is poured into the processing container, after which the processing container is accommodated within the container holder and the container holder is located on the base. Then, the container holder is pushed into the transmission part of the processing control box in such a manner that the contact part is brought into contact with the transmission part. When the top opening of the processing container is closed by pivoting the standing lid sidelong and the power supply switch is turned on, the first switch and the second switch become in closed conditions similar to the apparatus of the first embodiment. Next, when the processing operation by electrical conduction is started by impressing the conductive switch, electric current passes between a pair of the electrodes through the contact part from the transmission part and Chinese noodles can be nicely boiled and cooked in five to six minutes. Since the processing container, whose outside is heated, can be taken out together with the container holder without coming in direct contact with a hand and if the boiling water overflows the processing container during the processing operation, the boiling water can be caught in the container holder, the processing operation by electrical conduction can be sanitarily and safely performed without unnecessarily staining the base.

Besides, since the temperature sensor disposed on the lid is hung through the steam passageway and the tip faces the processing container and foodstuffs, liquid temperatures can be directly measured and sensed, if the heating operation at a low temperature is performed in the degree to which steam doesn't generate, the foodstuffs can be more accurately and easily warmed and cooked.

Since the apparatus for producing prepared food by electrical conduction in accordance with the present invention is formed as described above, the following effects can be achieved.

Even if the foodstuffs, accommodated within the processing container having an open top and a pair of electrodes disposed on two sides of the inner processing container, are preprocessed instant or non-instant foods, they are accommodated in the processing container together with a suitable amount of water or moisture; the lid closes the open top of the processing container by pivoting the operation arm sidelong, under this condition, the foodstuffs can be accurately warmed and cooked to an appropriate temperature employing electrical conduction between a pair of electrodes through the transmission and contact parts, and the foodstuffs can be sufficiently boiled in a very short time; unprocessed foods can be cooked and rice can be cooked by using unprocessed rice; uncooked or cooked foods can be warmed or cooked; if the processing container is made of disposable materials, the processing container is accommodated within the container holder and foodstuffs can be safely warmed and cooked by electrical conduction between a pair of electrodes; the container holder can be effectively used for keeping the processing container in shape and for receiving overflown soup; since the operating arm is provided with the temperature sensor in which the sensor senses a temperature of a steam discharged through the steam discharging port or a temperature of foodstuffs accommodated in the processing container, the sensor quickly senses a temperature of the steam heat, foodstuffs, and liquid being raised in the processing container and the power supply to a pair of electrodes are shut off automatically when the sensor senses the predetermined temperature. And then, products superior in quality can be provided.

Since the lid is detachably disposed on the operating arm, the lid suited to the shape of the processing container can be replaced, attached and used widely.

In addition, since the start switch is provided in the processing control box, the first switch which senses whether the transmission part keeps in contact with the contact part of the processing container and the second switch which sense whether the lid covers the top opening of the processing container placed on the processing container, and the start switch is shut off and electricity transmits to a pair of electrodes only when the first and second switches are in closed conditions. Therefore, the processing operation by electrical conduction can be more safely and accurately performed and it can be repeatedly and rapidly performed while preventing an accident such as electric shock from occurring.

What is claimed is:

1. An apparatus for producing a prepared food comprising:
   a processing container having a bottom wall, a side wall and an open top, a pair of electrodes disposed along inner surfaces of said side all of the container, said electrodes facing each other, one end of each said electrodes extending through said open top of the container to the outside so that a contact part is formed;
   a base member on which said processing container is detachably disposed;
   a control box for supplying electrical current, said control box being mounted on one side of said base member, said control box being provided with a transmission part, which when said processing container is disposed on said base member contacts with said contact part so that electricity is supplied to said electrodes;
   an operating arm vertically pivoted at one end to the top of said control box and movable between a first and a second position;
   a lid connected to another end of said operating arm and covering the open top of said processing container when said operating arm is in said second position; and
   a temperature sensor connected to a tip of said another end of said operating arm for sensing a temperature of said processing container.

2. An apparatus for producing a prepared food as claimed in claim 1, wherein said temperature sensor is disposed in said lid and said lid is also provided with a steam discharging port formed in a wall thereof.

3. An apparatus for producing a prepared food as claimed in claim 1, wherein said lid is detachably attached to said operating arm.

4. An apparatus for producing a prepared food as claimed in claim 2, wherein said temperature sensor faces towards said steam discharging port formed in the lid.

5. An apparatus for producing a prepared food as claimed in claim 1, wherein said temperature sensor is disposed in a steam discharging port, said steam discharge port being formed in a wall of said lid and a tip of said temperature sensor faces towards the processing container.

6. An apparatus for producing a prepared food as claimed in claim 1, wherein said control box is provided with a start switch, a first switch, and a second switch, said first switch which closes when said transmission part is in contact with said contact part of said processing container for electrical conduction, and said second switch which closes when said lid covers said open top of said processing container, whereby when said start switch is closed electricity is supplied to said pair of electrodes only when said first and second switches are in closed conditions.

7. An apparatus for producing a prepared food comprising:
   a processing container having a bottom wall, side walls and an open top, a pair of electrodes mounted on inner surfaces of opposite side walls of the processing container, one end of each said electrodes extending to the outside of the container so that a contact part is formed;
   a container holder for removably holding said processing container which permits the processing container to be freely inserted and removed from the holder;
   a base onto which said container holder is detachably disposed, said base accommodating said processing container therein;
   a control box for supplying an electrical current mounted on one side of said base and provided with a transmission part in contact with said contact part, when said container holder with said processing container is disposed on said base, so that electrical current is supplied to said electrodes;
   an operating arm vertically pivoted at one end to the top of said control box and said operating arm movable between an upward and downward position;
   a lid disposed on another end of said operating arm and covering the open top of said processing container when said operating arm is in said downward position; and
   a temperature sensor connected to a tip of said operating arm at said another end of said arm for sensing a temperature in said processing container.

8. An apparatus for producing a prepared food as claimed in claim 7, wherein said lid is detachably mounted on the temperature sensor and wherein a steam discharging port is provided in a wall of said lid.

9. An apparatus for producing a prepared food as claimed in claim 7, wherein said lid is detachably connected to the operating arm.

10. An apparatus for producing a prepared food as claimed in claim 7, wherein said temperature sensor faces towards a steam discharging port which said steam discharge port is formed in a wall of the lid.

11. An apparatus for producing a prepared food as claimed in claim 7, wherein said temperature sensor is disposed in a steam discharging port, said steam discharge port formed in a wall of the lid and said tip of said temperature sensor faces towards the processing container.

12. An apparatus for producing a prepared food as claimed in claim 7, wherein said control box is provided with a start switch, a first switch, and a second switch, said first switch which closes when said transmission part is in contact with said contact part of said processing container for electrical conduction, and said second switch which closes when said lid covers the open top of said processing container, whereby when said start switch is closed electricity is supplied to said pair of electrodes only when said first and second switches are in closed conditions.

* * * * *